United States Patent
Solioz

(10) Patent No.: US 7,363,503 B2
(45) Date of Patent: Apr. 22, 2008

(54) METHOD FOR PRODUCING A DATA STRUCTURE FOR USE IN PASSWORD IDENTIFICATION

(75) Inventor: Roger Solioz, Chexbres (CH)

(73) Assignee: Savernova A.G. (CH)

( * ) Notice: Subject to any disclaimer, the term of this patent is extended or adjusted under 35 U.S.C. 154(b) by 842 days.

(21) Appl. No.: 10/181,330

(22) PCT Filed: Jan. 16, 2001

(86) PCT No.: PCT/CH01/00031

§ 371 (c)(1),
(2), (4) Date: Jul. 15, 2002

(87) PCT Pub. No.: WO01/54073

PCT Pub. Date: Jul. 26, 2001

(65) Prior Publication Data

US 2003/0005338 A1    Jan. 2, 2003

(30) Foreign Application Priority Data

Jan. 17, 2000  (CH)  .................................. 0080/00

(51) Int. Cl.
*H04K 1/00*    (2006.01)
*H04L 9/32*    (2006.01)
(52) U.S. Cl. .............................. 713/184; 726/5; 726/27
(58) Field of Classification Search ................ 713/184; 726/5, 27
See application file for complete search history.

(56) References Cited

U.S. PATENT DOCUMENTS 4,962,530 A * 10/1990 Cairns ........................ 713/183
5,177,789 A * 1/1993 Covert ........................ 713/184
5,261,000 A * 11/1993 Hamamoto .................. 713/184
5,428,349 A    6/1995 Baker
5,825,871 A * 10/1998 Mark ...................... 379/357.03
2002/0178370 A1 * 11/2002 Gurevich et al. ........... 713/189

FOREIGN PATENT DOCUMENTS

WO          91/06904          5/1991
WO          96/42075          12/1996

* cited by examiner

Primary Examiner—Emmanuel L. Moise
Assistant Examiner—Ali S Abyaneh
(74) Attorney, Agent, or Firm—Ostrolenk, Faber, Gerb & Soffen, LLP

(57) ABSTRACT

Passwords consisting of symbols selected from a third set of third symbols, of which a first set constitutes a subset of the first symbols, can be created from a data structure. The method for obtaining this structure comprises the following steps: preparation of a second set of at least two second symbols; creation of a first number of first lists of the first symbols, each list being contained in a third list constituted of the third symbols; creation of a second list of the second symbols, each symbol appearing in that list only once; association of a first list with each symbol of the second list; association of a second symbol to each symbol of the first lists. With this structure (27), a multitude of pseudo-aleatory passwords can be created by means of a code comprising a second symbol, a subcode of at least one first symbol, and a reading path (51) of the symbols in the third lists of the structure, starting from a first symbol found by using the second symbol and the subcode.

10 Claims, 10 Drawing Sheets

| 29 | | | | | |
|---|---|---|---|---|---|
| (0;0) | (1;0) | (2;0) | (3;0) | (4;0) | (5;0) |
| (0;1) | (1;1) | (2;1) | (3;1) | (4;1) | (5;1) |
| (0;2) | (1;2) | (2;2) | (3;2) | (4;2) | (5;2) |
| (0;3) | (1;3) | (2;3) | (3;3) | (4;3) | (5;3) |

| ♠ | ♦ | ♣ | ♠ |
|---|---|---|---|
| C♣ | A♣ | E♦ | B♥ |
| B♠ | C♥ | C♣ | A♠ |
| A♥ | D♠ | D♦ | C♦ |
| D♥ | E♠ | A♦ | D♣ |
| E♠ | E♥ | A♦ | D♣ |
| C♣ | A♣ | E♦ | B♥ |
| B♠ | C♥ | C♣ | A♠ |
| A♥ | D♠ | D♦ | C♦ |
| D♥ | D♦ | B♣ | E♣ |
| E♠ | E♥ | A♦ | D♣ |

FIGURE 9

METHOD FOR PRODUCING A DATA STRUCTURE FOR USE IN PASSWORD IDENTIFICATION

CROSS REFERENCE TO RELATED APPLICATIONS

The present application is a 35 U.S.C. §371 national phase conversion of PCT/CH01/00031, filed Jan. 16, 2001, which claims priority of Swiss Application No. 80/00, filed Jan. 17, 2000, which are herein incorporated by reference. The PCT International Application was published in the French language.

BACKGROUND OF THE INVENTION

The present invention refers to a method for producing a data structure for use in password identification. The invention further refers to a product obtained according to the method and to a method using that product.

DESCRIPTION OF THE RELATED ART

Every user of information technology has already been confronted with the problem of choosing an access password. The difficulty is to remember the password. This is why most people use words that are easy to remember, such as proper or common names that are often related to their activities. Furthermore, many people use the same password for a plurality of systems.

In order to ensure a high security in the area of IT networks and business computing, it is advisable or even compulsory to use passwords that are sufficiently long, not trivial (i.e. easy to guess), and where letters, numbers, and other special characters are mixed. In addition, it is necessary to use a different password for each system and to change passwords regularly. Of course, it is highly unadvisable to write down the passwords, they must be memorized. Hence, there is a conflict between the requirements of IT security and the memorizing faculty of users.

SUMMARY OF THE INVENTION

It is therefore an object of the invention to provide a method for creating a data structure that can be used, e.g. in the form of a readable representation or stored on a disk, in order to create passwords requiring considerably reduced memorizing efforts of the user.

Such a method is defined herein. The specification refers to preferred embodiments of the method, to a product obtained in this manner, and to an application mode of the product.

The invention is part of a novel identification system that allows to create passwords, i.e. sequences of determined symbols, and to memorize them according to a single principle that is valid for all created passwords. The application of the principle used for creating the passwords enables a system to retrieve them. Without knowledge of the principle, this is impossible.

BRIEF DESCRIPTION OF THE DRAWINGS

The invention will be described hereinafter by means of an exemplary embodiment and with reference to the following figures:

FIG. 6: Coordinate system of matrix
FIG. 8: Search for starting cell
FIG. 9: Creation of the password according to reading path

DETAILED DESCRIPTION OF THE PREFERRED EMBODIMENTS

Figure 1:
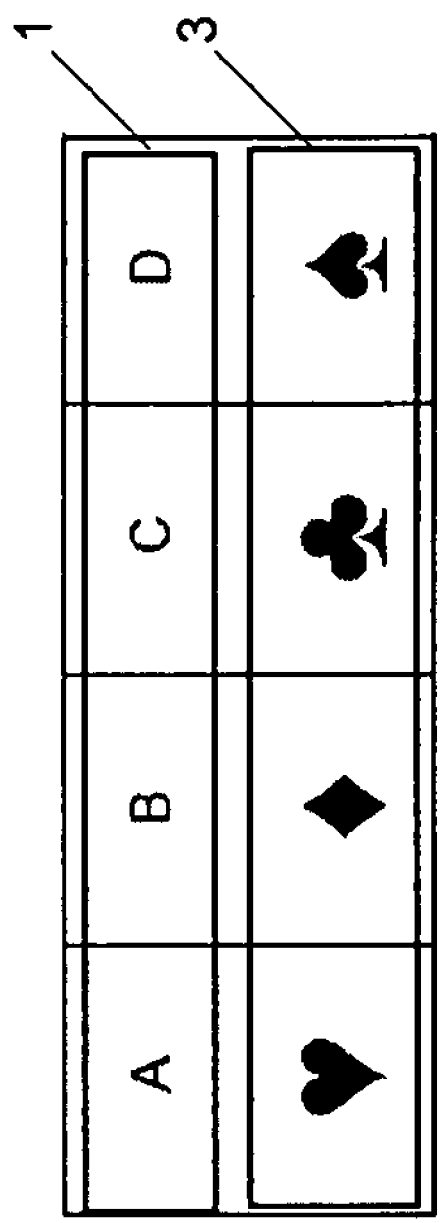
FIG. 1: List of symbols

The system comprises an encoding system, a password creation system, and an identification system.

Encoding System

The encoding system is based on the list of symbols participating in the composition of the passwords and on a list of arbitrary chosen symbols.

For a better understanding of the following text, the symbols participating in the composition of the passwords are called "characters", and the arbitrary chosen symbols are called "symbols".

The encoding system creates a matrix whose dimensions are determined, on one hand, by the number of "characters" and, on the other hand, by the number of "symbols". Thus, the encoding system creates a matrix comprising a number of columns equal to the number of "characters" and a number of rows equal to the number of "symbols", or vice-versa. In fact, for the following explanation, the first case will be chosen.

The encoding system arbitrary distributes all of the "characters" of the list of symbols participating in the composition of passwords on the first row of the matrix. The encoding system repeats the operation with a new list of "characters" on the second row, and so on, until the matrix is full.

The encoding system adds a column to the matrix. All of the "symbols" of the list of arbitrary symbols are distributed on this column.

Then, the encoding system associates one of the "symbols" to each one of the "characters" of the matrix exactly once.

For this purpose, the encoding system may prepare as many lists of arbitrary symbols in storage locations as there are "characters". It arbitrary arranges the "symbols" of each list and associates each one of the latter to one of the "characters". Then, the encoding system searches every case of the matrix and reads the "character" inscribed therein, and subsequently selects one of the "symbols" contained in the list that is associated to that character. The encoding system repeats this operation on every case of the matrix.

The encoding system stores or prints the matrix on a medium of any kind so as to allow it to be transported physically or electronically.

Password Creation System

The password creation system chooses a code composed of one or a plurality of "characters" selected from the list of symbols participating in the composition of passwords. Then, it creates a matrix from which it chooses one of the cases as the so-called starting cell. Subsequently, in the created matrix, it will choose a "reading path" according to which it proceeds in relation to the starting cell. The "reading path" is composed of the sequence of relative coordinates with respect to the position of the starting cell. The "reading path" is not subject to any rule and may be discontinuous.

In order to create a password, the password creation system uses the matrix encoded by the encoding system. It chooses one of the "symbols" as a "starting point". It searches the row associated to the "starting point symbol" and compares the "characters" in this row to the first "character" it has chosen for its code. When it hits the same "character", the password creation system reads the "symbol" associated to that "character" in the matrix. It subsequently searches the row to which the new "symbol" is associated and compares the "characters" to the second "character" it has chosen for its code. The operation is repeated until the last "character" it has chosen for its code has been found in the matrix.

Then, the password creation system reads the characters by moving through the matrix according to the previously created "reading path" and using the cell containing the last located "character" as the starting cell. The created password is composed of the "characters" read according to this procedure.

The created password is transmitted to the identification system.

Identification System

In order to be accepted by the identification system, the matrix encoded by the encoding system and the code, the "reading path", and the "starting point symbol" used by the password creation system must be transmitted to the identification system.

With the provided elements, the identification system applies the same principle as that used for creating the password, and compares the obtained password to that transmitted by the password creation system. If they match, the identification is accepted, otherwise it isn't.

Alternatives with Additional Elements

It is possible to enlarge the matrix by including arbitrary distributed free cells in order to add additional elements such as special characters. These additional elements do not play any role for the encoding system, which ignores them. In contrast, they are taken into account by the password creation system in the readout according to the predefined path. This allows the passwords to include special characters.

Alternatives in Password Creation

The elements required for password creation may be partly determined by the identification system. The latter may transmit a part of the code required for password creation to the password creation system, and this part may be changed at every identification. In the password creation, the password creation system integrates these elements and then transmits the password or passwords to the identification system. The identification system also integrates these elements at identification time.

This allows using a different password for each identification, which may be useful for applications requiring a "challenge-response" or a unique password.

Advantages of the Invention

It is not necessary to transmit the unencoded password for identification.

The password creation system may repeatedly use the same principle for creating different passwords by simply exchanging the "starting point symbol" or by exchanging the encoded matrix.

The passwords are not stored or printed in the unencoded form. It is practically impossible to retrieve them in the encoded matrix without knowing the applied password creation principle.

The encoding system allows creating an almost unlimited number of different encoded matrixes.

The encoding matrix may be printed, and it is possible to find the password manually in order to gain access to simple systems without an automatic identification system.

Realization of the Invention

The realization of the identification system according to the example includes four steps:
1. Choice of the elements
2. Encoding of the matrix
3. Creation of a password
4. Identification Choice of the Elements The elements are chosen in function of the systems for which they are used. In our example, we will use a restricted number of elements for the sake of simplicity.

The symbols participating in the composition of the passwords will be chosen among the following symbols 1: "A B C D E" (FIG. 1).

The symbols 3 "hearts", "diamonds", "clubs", and "spades" will serve as arbitrarily chosen symbols.

Encoding of the Matrix

The encoding system creates e.g. a matrix 5 including 5 columns and 4 rows, corresponding to the number of available "characters" 1 and "symbols" 3.

Figure 2:
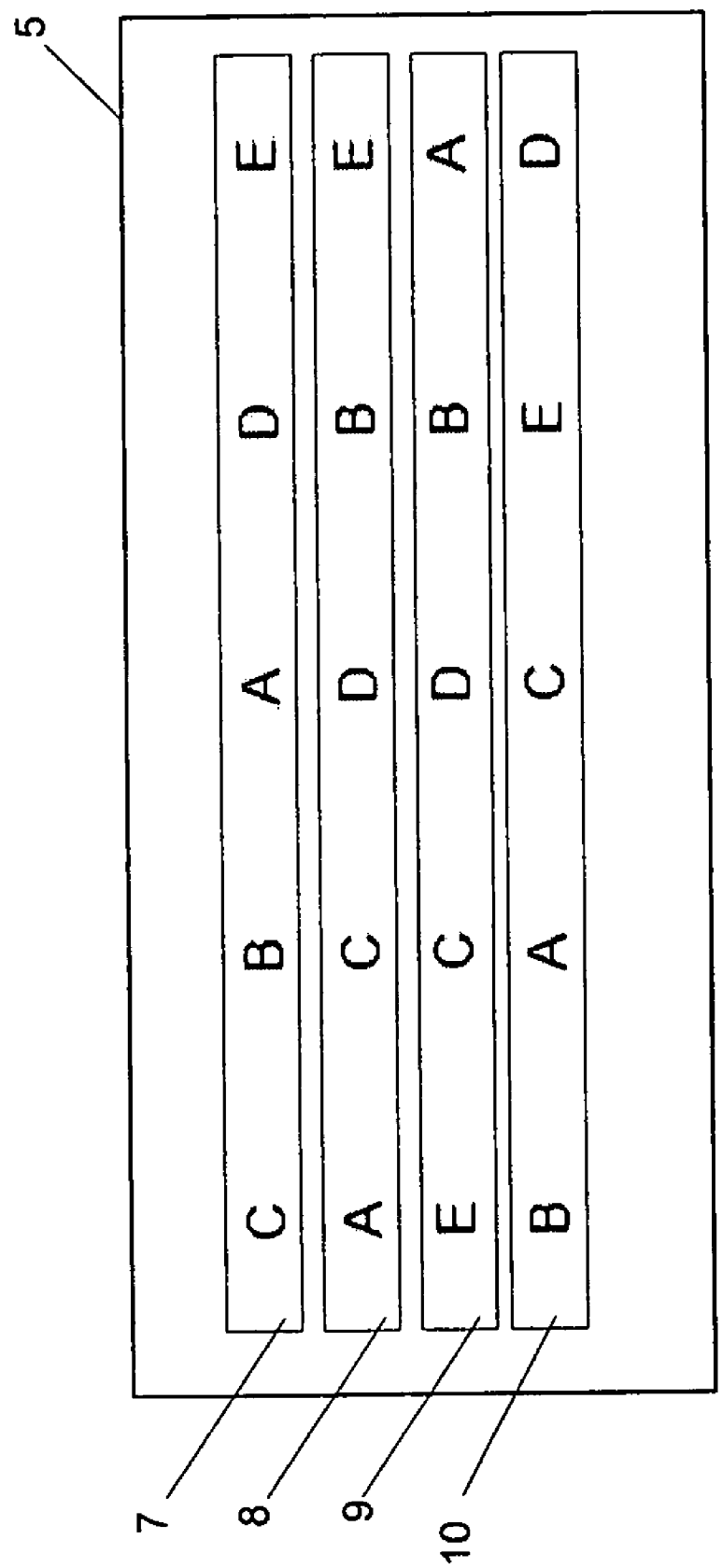
FIG. 2: "Character" matrix

The encoding system arbitrarily distributes the "characters" on the first row 7 of the matrix, for example: "C B A D E". It repeats the operation on the second row 8, the third row 9 and the fourth row 10. A matrix 5 ("C B A D E", "A C D B E", "E C D B A", "B A C E D") as described in FIG. 2 is obtained.

Figure 3:
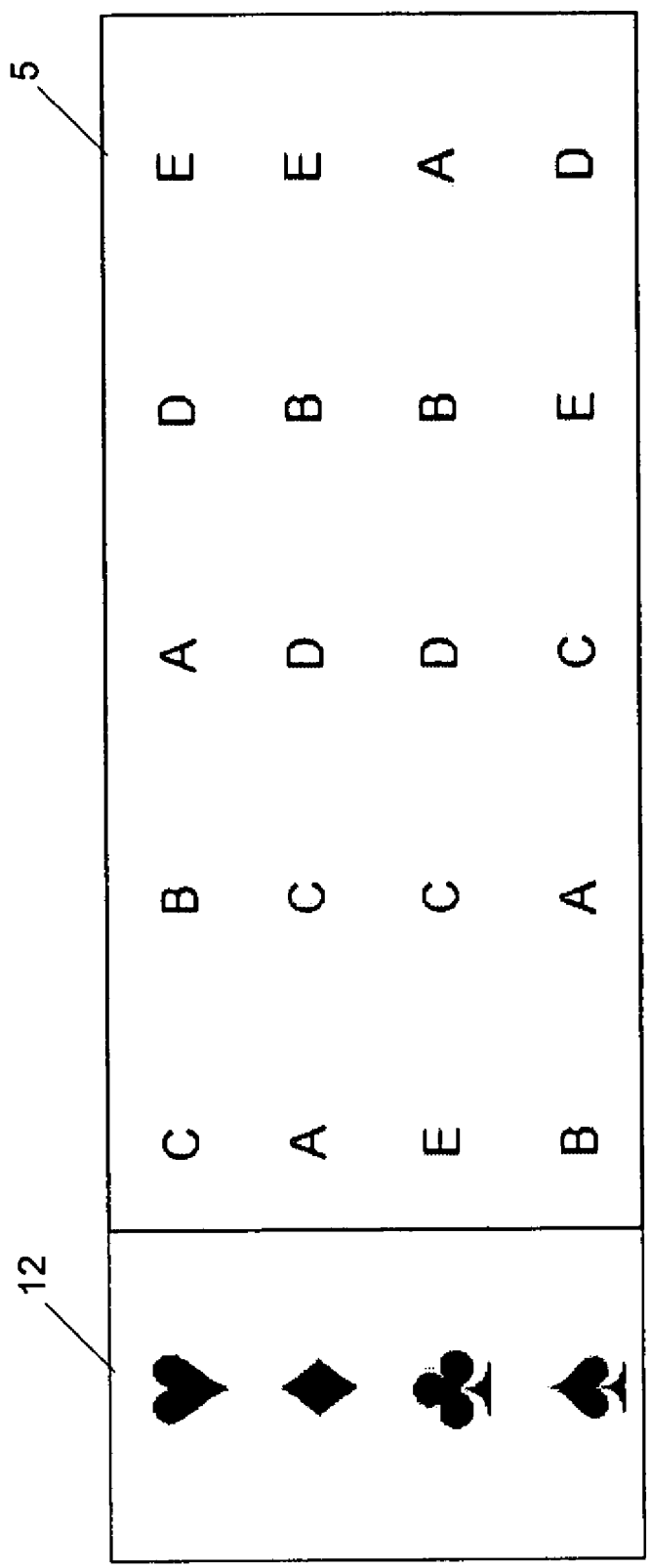
FIG. 3: Column of "symbols" added to matrix

The encoding system adds a column 12 to the matrix and distributes the symbols 3 of the list of arbitrarily symbols on the latter, e.g. "hearts diamonds clubs spades" (FIG. 3).

The encoding system stores five lists of "symbols" 3 (since there are 5 "characters") in which it arbitrary arranges the symbols 3, e.g. "hearts clubs diamonds spades" 16, "spades diamonds clubs hearts" 17, "clubs hearts spades diamonds" 18, "hearts spades diamonds clubs" 19, and "spades hearts diamonds clubs" 20.

Figure 4:
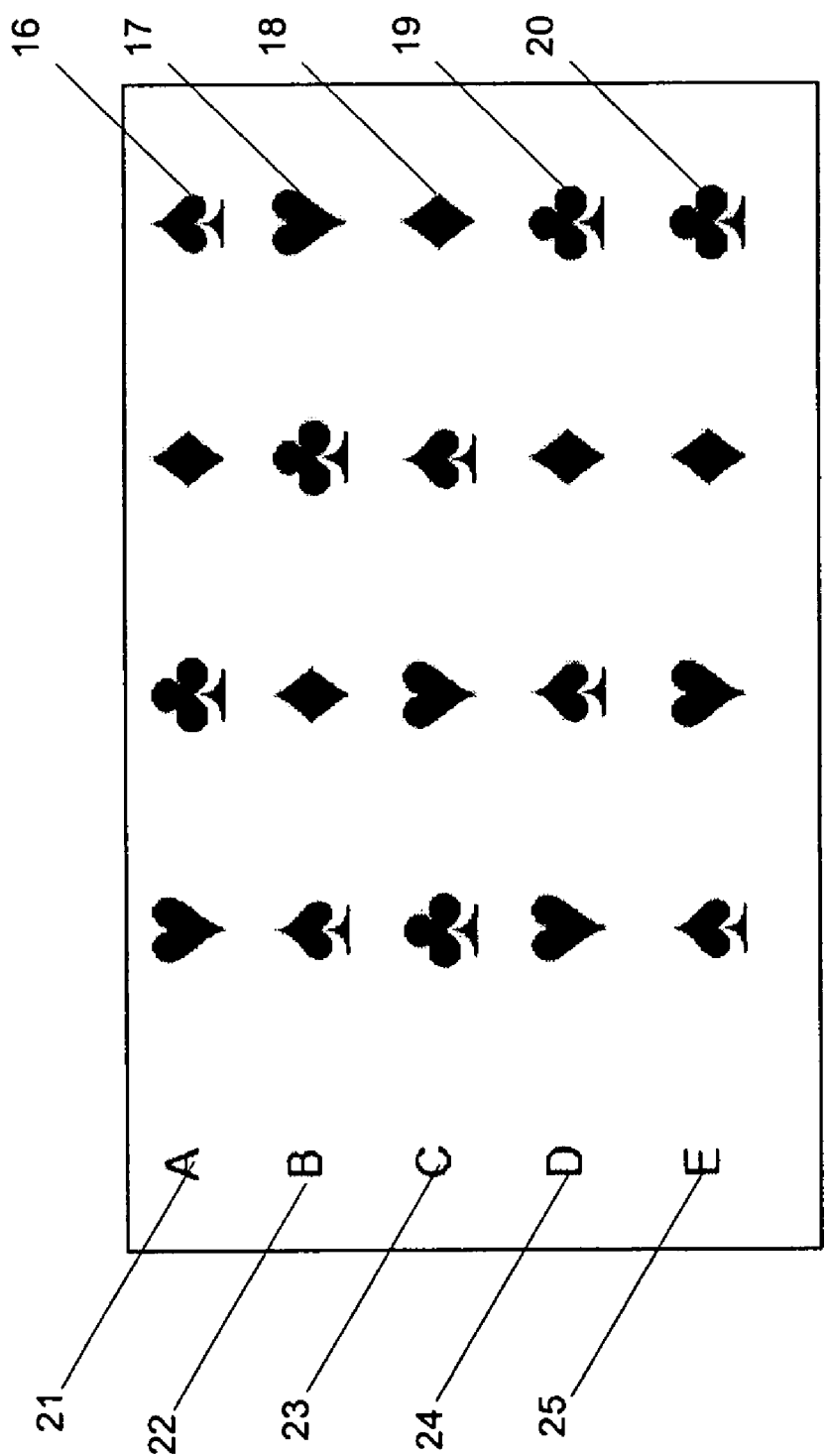
FIG. 4: Lists of "symbols" and associated letters

The encoding system associates one of the lists of "symbols" 16-20 to each "character" 1. For example, it associates the first list 16 to character "A" 21, the second list 17 to character "B" 22, the third list 18 to character "C" 23, the fourth list 19 to character "D" 24, and the fifth list 20 to character "E" 25 (FIG. 4).

Figure 5:
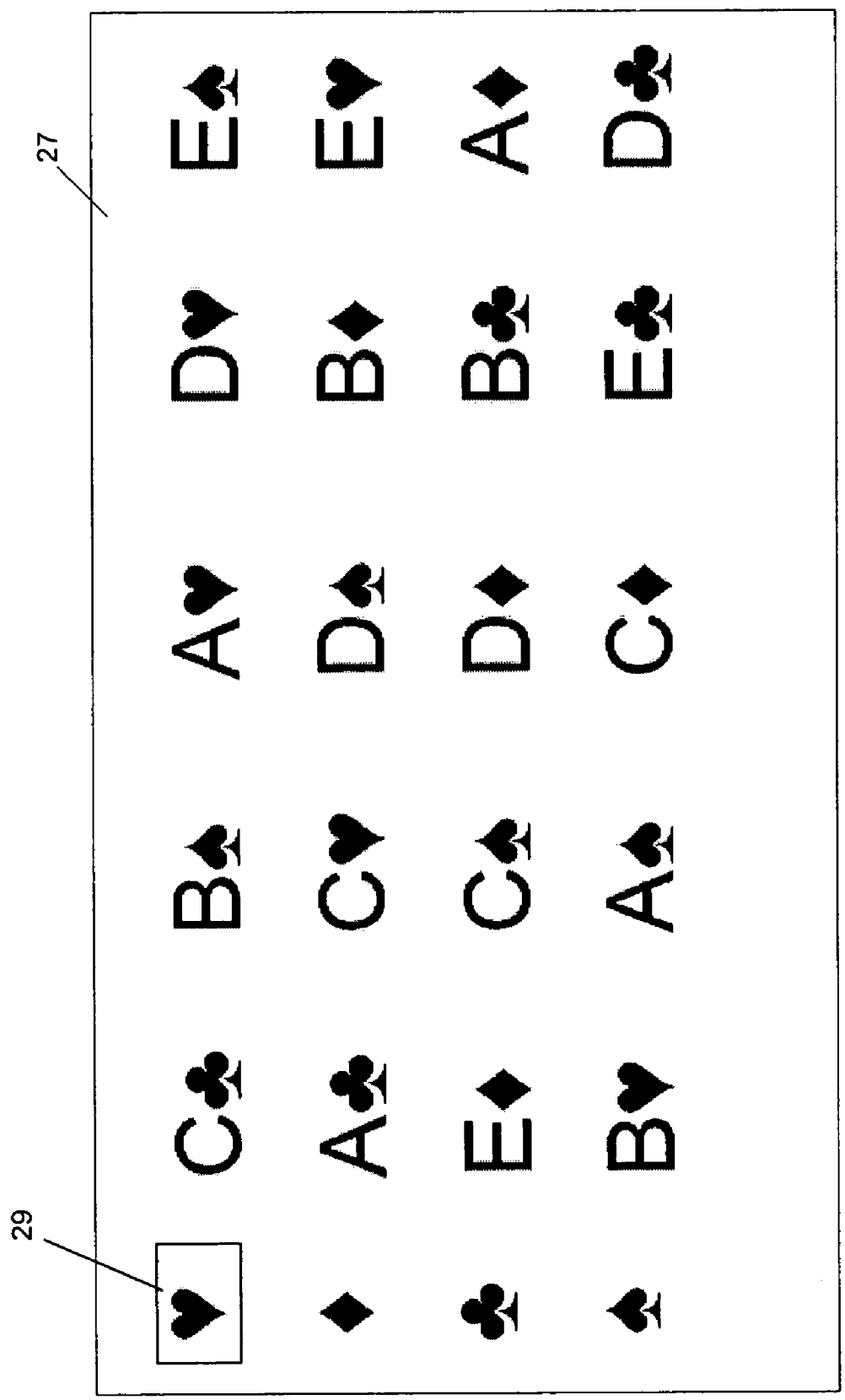
FIG. 5: Encoded matrix

The encoding system searches the matrix and associates with each "character" 1 the following "symbol" 3 extracted from the associated list 16-20 of "symbols". Thus, on the first row, it associates "clubs" with "C", "spades" with "B", "hearts" with "A", "hearts" with "D", and "spades" with "E". It applies the same method to each row of the table, thus obtaining matrix 27 (FIG. 5).

Creation of a Password

The password creation system uses the encoded matrix. It creates a coordinate system allowing it to find each cell of matrix 27 by its absolute coordinates. For example, it uses the first case 29 at the top left of matrix 27 as the origin and numbers from 0 on the abscissa and the ordinate (FIG. 6).

Figure 7:
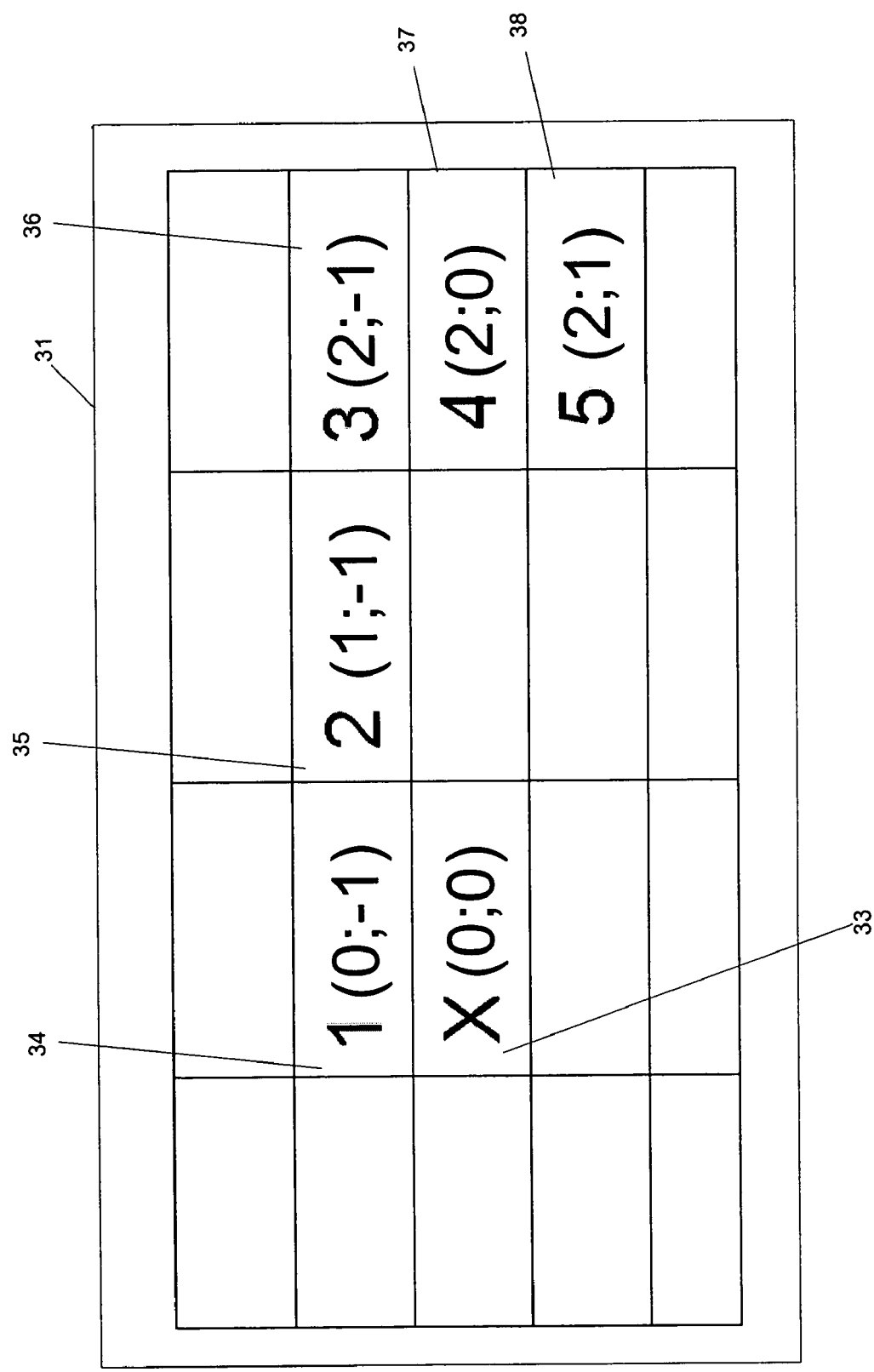
FIG. 7: Reading path

The password creation system creates an arbitrary matrix 31, e.g. of 5 rows and 4 columns, and chooses a cell as the starting cell 33 and as the origin (0;0). The end user for which this password is dedicated is required to chooses a "reading path", e.g. consisting of a displacement from cell 34 above the starting cell by two cells 35-36 to the right, and then by two cells 37-38 down. FIG. 7 describes the "reading path", starting cell 33 is indicated by an "X", and cells 34-38 constituting the path are numbered from 1 to 5. The system stores the relative coordinates of each cell 34-38 of the path in relation to starting cell 33.

Then, the password creation system chooses a code composed e.g. of two "characters" 1: "D B". It also chooses a "symbol" 3 as a "starting point", e.g. "clubs".

Figure 8:
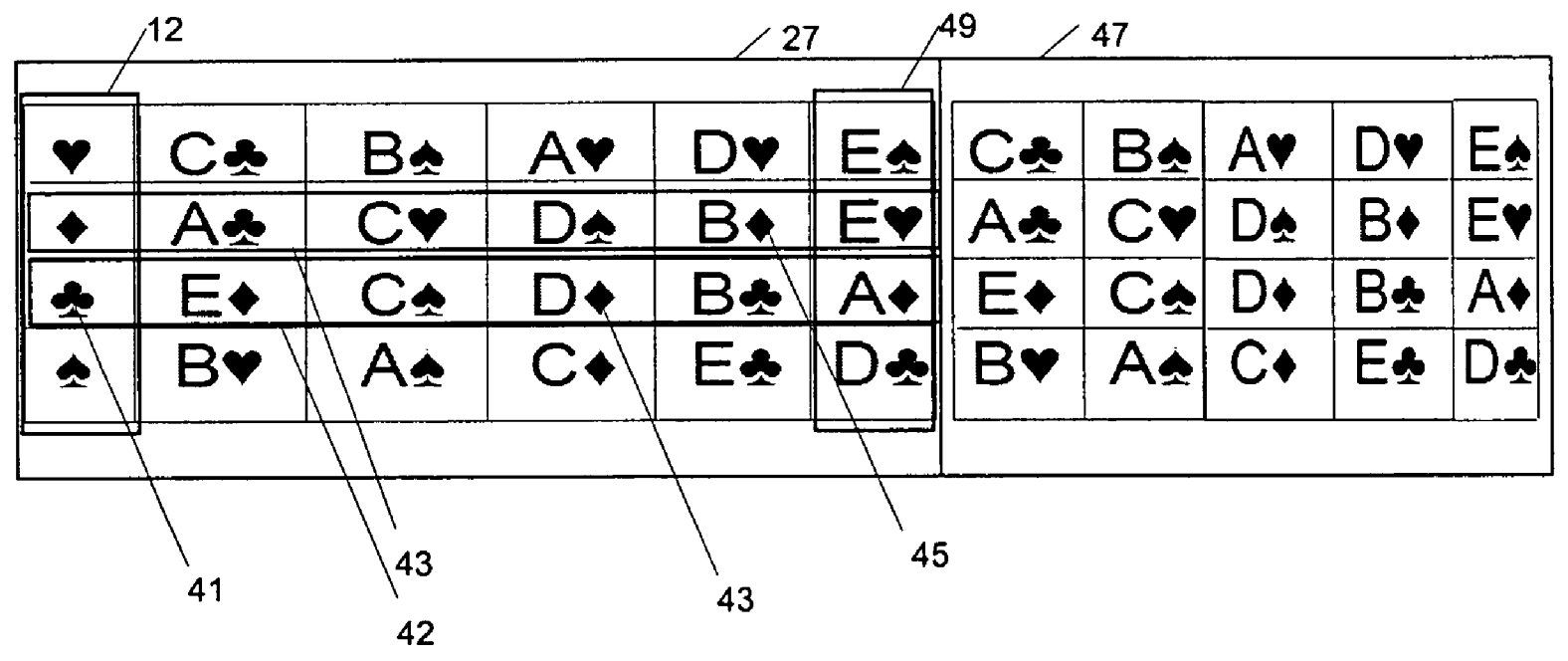

In order to create the password, the system searches the column 12 of encoded matrix 27 that only contains "symbols" 3 and compares the "symbols" of that column to the symbol it has chosen as a "starting point", i.e. "clubs" 41 (FIG. 8). When they match, it memorizes the row on which this "symbol" 42 is located, i.e. in our example the third row. It searches that row and compares the "characters" 1 to the first one of its code, i.e. "D". When the characters match, it stores the "symbol" 1 associated to that character 43 in the matrix, i.e. in our example "diamonds" 43. The system again searches the column 12 containing only "symbols" and now compares the "symbols" 3 to the one just stored ("diamonds" 43). When they match, it memorizes the row 44 on which that "symbol" is located. It searches row 44 and compares the "characters" 1 to the second "character" of its code ("B"). When the characters match, the system stores cell 45 of matrix 27, in which that character is located, as this is the last character in its code. In our example, the system stores the cell (4;1) as the starting cell (see FIG. 6).

In relation to this starting cell 45 and according to the previously determined "reading path", the system reads out the "characters" present in matrix 27. For this purpose, it is sufficient to add the relative coordinates of the "reading path" to the absolute coordinates of starting cell 45 (4;1). If the values obtained by the system are outside the limits of matrix 27, the system creates a copy 47 of character matrix 5 and places it adjacent to first matrix 27 in order to be able to continue the "reading path". To this end, column 12 is ignored, i.e. a copy of matrix 27 is added on the right of the last column 49 of "characters" 1, if necessary.

The system can then read the cells (4;0), (5;0), (6;0), (6;1), and (6;2), as described in FIG. 9. From these cells, the system reads out the sequence 51 of "characters" 1 "DECAE". This is the password that is transmitted to the identification system.

Identification

In order to proceed to an identification, the identification system must be provided with the encoded matrix 27, which the system will read and store. Furthermore, it must be provided with the code "DB" of our example, with the "starting point symbol" "clubs" and the "reading path" as described in FIG. 7.

With the provided elements, the identification system applies the same principle as that used for creating the password. It will find a sequence of "characters" and compares it to the password that has been transmitted by the password creation system. If the two sequences of characters match, the identification is successful; in the opposite case it is not.

Example of Application

An exemplary application will be given for the access to an IT workstation (computer). Each user receives a diskette on which any encoded matrix 27 is stored. Each user must be identified by the system the first time. For this purpose, the user must insert the diskette in the computer with the password creation system installed and create his or her password, i.e. a code (e.g. two letters), a "starting point symbol" and a "reading path" (that can be inscribed in a grid on the screen). Using the method described above, the system stores the created password and transmits it to the identification system.

An IT application is running on the personal computer of the user. In order to be identified, the user must insert the diskette containing the encoded matrix and provide the system with the previously chosen elements, i.e. the individual code, the "starting point symbol" and the "reading path" of that user. The identification system reads the encoded matrix from diskette and uses the same system as previously described to compare the obtained sequence of characters to the password that has been transmitted by the password creation system. If they are identical, the system authorizes the user to access the services, otherwise it doesn't.

The user may create new passwords by changing the "starting point symbol" or by exchanging the encoded matrix (by taking a new diskette, for example). It is no longer necessary for the user to remember his passwords, but only the elements required for creating them and which remain identical for all of his passwords, and memorizing problems are eliminated.

Of course, the scope of the invention is not limited to the cited example, and those skilled in the art may conceive modifications without leaving the scope of the invention as defined by the claims. Thus, a password may also be elaborated by the user manually by means of a graphic realization printed on a support of any kind (cardboard, plastics). The password may also be entered to a counter or a computer, etc. having no appropriate drive, by means of an standard alphanumerical keyboard or else by means of a reduced set of keys, e.g. similar to the keypad of a telephone where the keys are furthermore associated to multiple characters.

Furthermore, it is also conceivable to provide one or a plurality of rows in the matrix that are not associated with a symbol, similarly to the alternative with additional elements in one or a plurality of rows.

Figure 10:
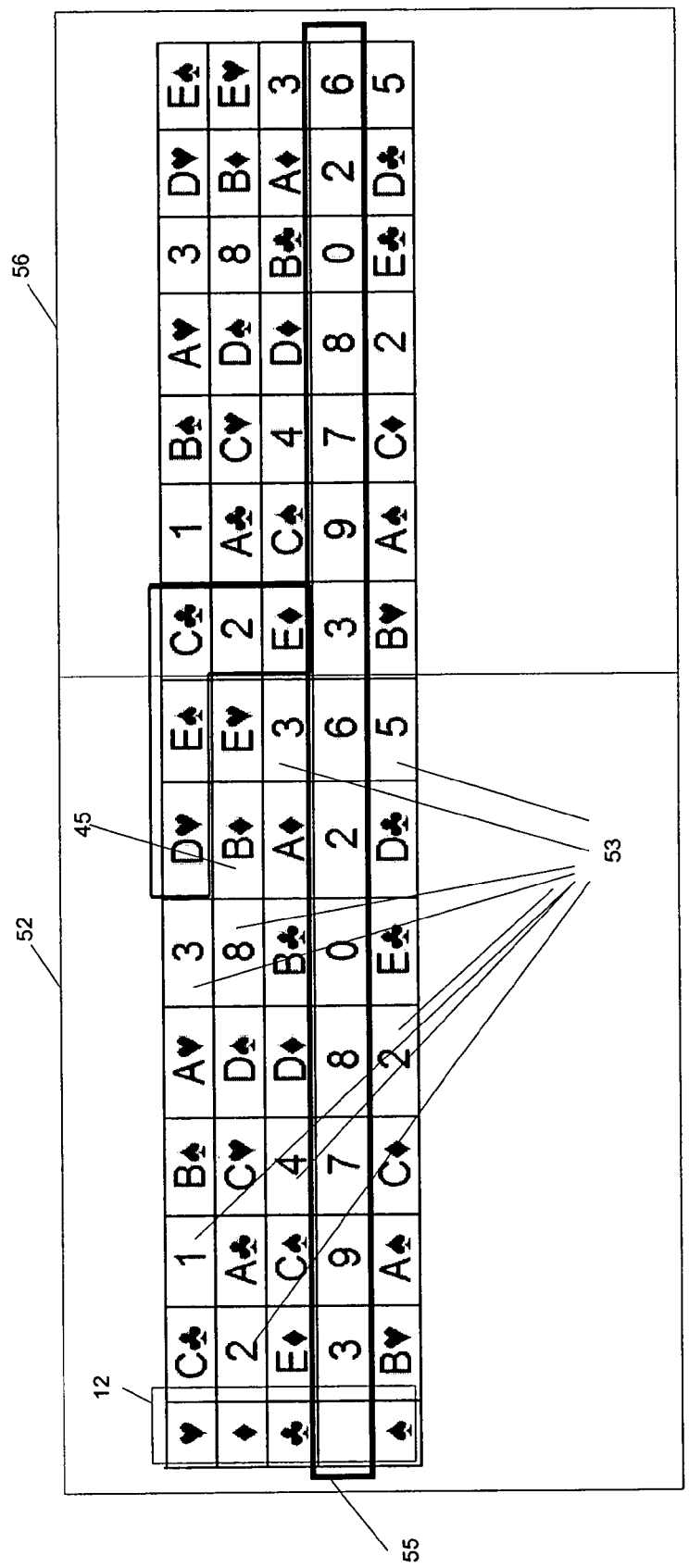
FIG. 10: Same as FIG. 9, but using a matrix including additional characters

FIG. 10 shows the example of a matrix 52 containing additional elements (in the present case numbers) that are randomly distributed, and an additional row 53 containing numbers, i.e. the additional elements, as well. In order to be able to determine the password, a copy 56 of the matrix without column 12 is adjoined.

The additional elements (numbers) as well as additional row 53 are not taken into account by the encoding system. In contrast, the password creation system takes account of the additional elements in the readout according to the predefined path. The password created when using the method described above thus becomes "DEC2E".

In the context of manual input, it will be noted that the passwords created by the described system are apparently random sequences of characters and therefore very difficult if not impossible to guess. In particular, the well-known risk of using passwords created on the basis of the name or of other personal dates or data is eliminated.

The invention claimed is:

1. A method for verifying an identification code received from a user, the method comprising:

providing an identification system that is operable to electronically receive the identification code, wherein the identification system includes, a memory;

storing in the memory: at least one matrix of characters, a code, a starting point symbol and a set of relative coordinates, wherein the at least one matrix of characters, the code, the starting point symbol and the set of relative coordinates correspond to a respective user, and further wherein the set of relative coordinates defines a reading path;

electronically receiving by the identification system the identification code submitted by the respective user;

determining by the identification system a first matrix of characters used by the respective user;

selecting by the identification system a line in the first matrix of characters identified by the starting point symbol;

selecting by the identification system a column in the first matrix of characters identified by the code;

selecting by the identification system a starting cell defining the start of a calculated identification code, wherein the starting cell is located in the first matrix of characters at the intersection of the selected line and the selected column;

calculating by the identification system the calculated identification code of characters defined by the starting cell and the reading path, wherein the identification system calculates by retrieving characters in the first matrix that correspond with the starting cell and each relative coordinate in the set of relative coordinates;

comparing the calculated identification code and the received identification code;

and verifying the received identification code in case the received identification code from the respective user and the calculated identification code are the same.

2. The method according to claim 1, wherein in the set of relative coordinates, at least one coordinate defines a line different than the lines of the other relative coordinates.

3. The method according to claim 1, wherein in the set of relative coordinates, at least one coordinate defines a column not located next right of the column defined in the previous relative coordinate.

4. The method according to claim 1, wherein the set of relative coordinates define at least two reading directions.

5. The method according to claim 1, wherein the set of relative coordinates define a discontinuous reading path.

6. A system for verifying an identification code received from a user, the method comprising:

an identification system provided with memory, wherein the identification system electronically receives the identification code;

at least one matrix of characters, a code, a starting point symbol, and a set of relative coordinates defining a reading path that collectively correspond to a respective user and are stored in the memory; and the identification code that is electronically received by the identification system and submitted by the respective user, wherein the identification system:

determines a first matrix of characters used by the respective user;

selects a line in the first matrix of characters identified by the starting point symbol;

selects a column in the first matrix of characters identified by the code;

selects a starting cell defining the start of the identification code at the cell located at the selected line and the selected column;

calculates, by using the starting cell and the reading path to retrieve characters in the first matrix, a calculated identification code of characters corresponding with the starting cell and the set of relative coordinates;

compares the calculated identification code and the received identification code; and verifies the received identification code in case the received identification code from the respective user and the calculated identification code are the same.

7. The system according to claim 6, wherein in the set of relative coordinates, at least one coordinate defines a line different than the lines of the other relative coordinates.

8. The system according to claim 6, wherein in the set of relative coordinates, at least one coordinate defines a column not located next right of the column defined in the previous relative coordinate.

9. The system according to claim 6, wherein the set of relative coordinates define at least two reading directions.

10. The system according to claim 6, wherein the set of relative coordinates define a discontinuous reading path.

* * * * *